Dec. 31, 1957  E. W. SUTTER  2,818,139
ANTI-SKID DEVICE FOR MOTOR VEHICLES
Filed Dec. 24, 1956  2 Sheets-Sheet 1

INVENTOR.
Edward W. Sutter
BY Frease & Bishop
ATTORNEYS

Dec. 31, 1957   E. W. SUTTER   2,818,139
ANTI-SKID DEVICE FOR MOTOR VEHICLES
Filed Dec. 24, 1956   2 Sheets-Sheet 2
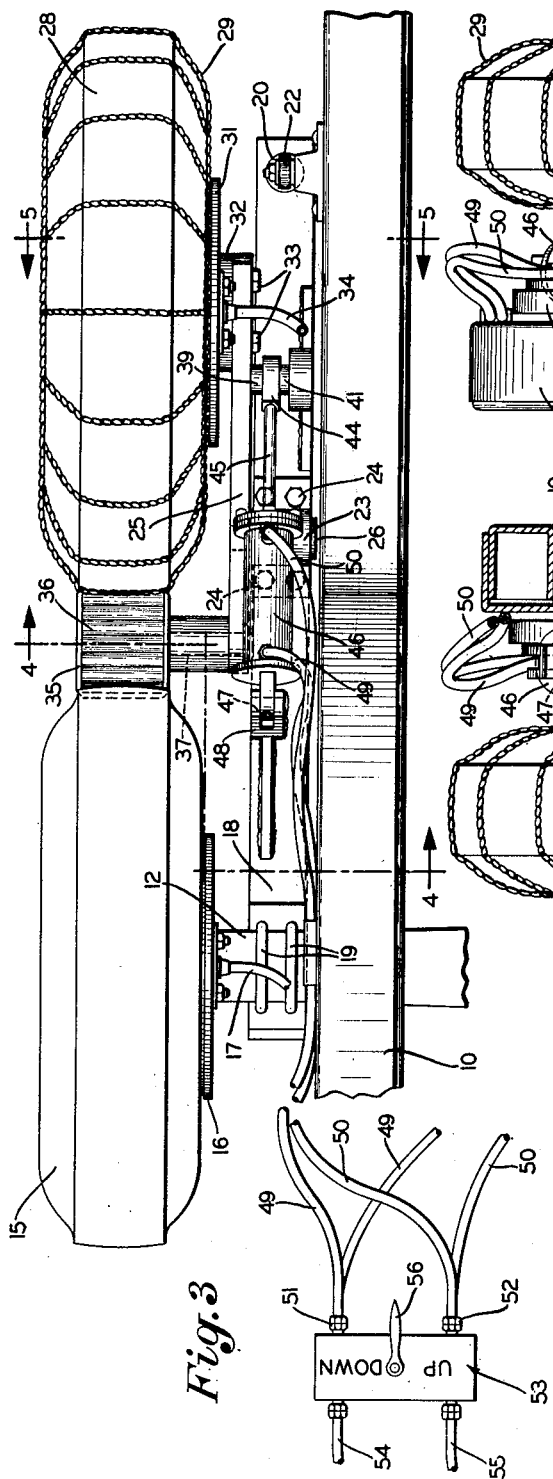
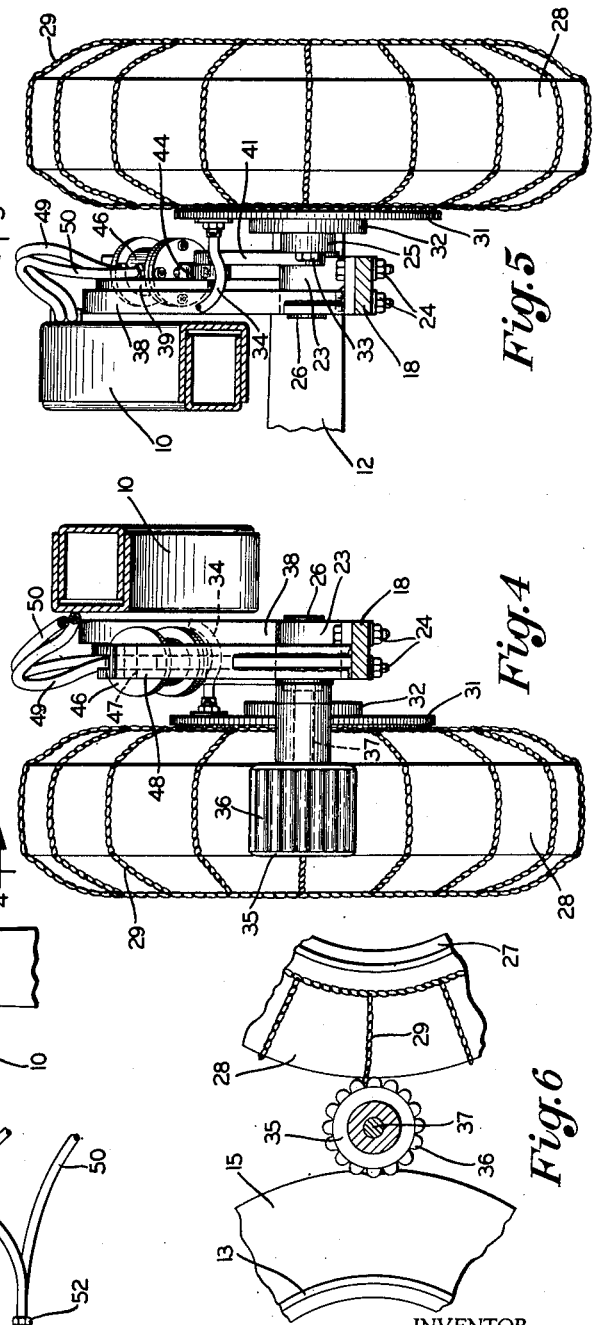
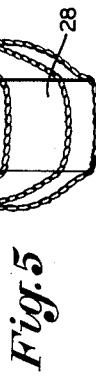
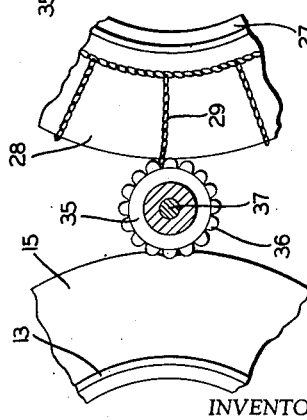
INVENTOR.
*Edward W. Sutter*
BY
*Frease & Bishop*
ATTORNEYS

United States Patent Office 2,818,139
Patented Dec. 31, 1957

2,818,139

ANTI-SKID DEVICE FOR MOTOR VEHICLES

Edward W. Sutter, near Ashland, Ohio

Application December 24, 1956, Serial No. 630,103

4 Claims. (Cl. 188—4)

The invention relates to devices for preventing skidding of automobiles and similar vehicles, and more particularly to such a device comprising rotary ground-engaging anti-skid means adapted to be operatively engaged with the drive wheels of the vehicle.

An object of the invention is to provide rotatable anti-skid wheels located directly behind the drive wheels and having gripping surfaces for engagement with the ground and adapted to be operatively engaged with the drive wheels.

Another object is to provide such a device in which the anti-skid means comprises rubber tired wheels of the same diameter as the drive wheels and having tire chains thereon.

Still another object is to provide such a device in which the anti-skid wheels are normally housed within the rear fenders of the vehicle.

It is also an object of the invention to provide such a device in which a relatively small idler wheel is adapted to be interposed between each drive wheel and the corresponding anti-skid wheel for rotating the anti-skid wheel at the same speed and in the same direction as the drive wheel.

A further object is to provide such an anti-skid device in which the anti-skid wheels are provided with brake means operable in unison with the brake means for the drive wheels.

The above objects together with others which will be apparent from the drawings and following description, or which may be later referred to, may be attained by constructing the improved anti-skid device in the manner hereinafter described in detail and illustrated in the accompanying drawings, in which:

Fig. 3 is an enlarged top plan view of the anti-skid device showing the same operatively connected to the drive wheel;

Fig. 4 is a section on the line 4—4, Fig. 3;

Fig. 5 is a section on the line 5—5, Fig. 3; and

Fig. 6 is a fragmentary elevation of portions of the drive wheel and the corresponding anti-skid wheel with the idler wheel in operative engagement therewith.

Figure 1:
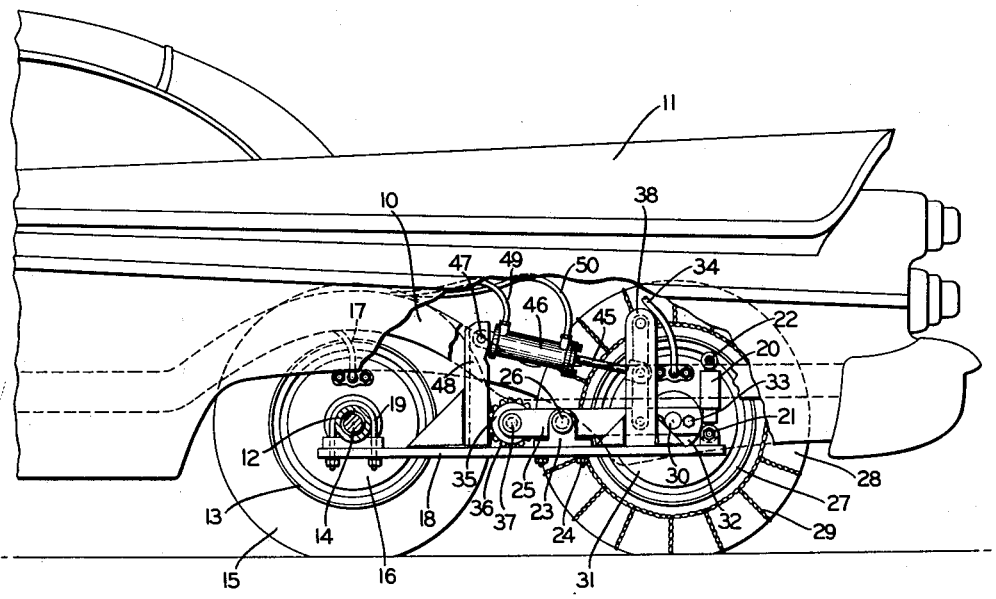
Fig. 1 is a fragmentary side elevation of the rear portion of an automobile provided with an anti-skid device embodying the invention, showing the anti-skid wheel in contact with the ground and operatively connected to the drive wheel, parts being broken away for the purpose of illustration.

In the embodiment of the invention illustrated, the anti-skid device is shown applied to an automobile of conventional design in which a portion of the frame is indicated at 10, a rear fender is shown at 11 and the rear axle housing at 12.

One drive wheel of the automobile is shown at 13 mounted upon the rear axle 14, journalled within the housing 12. The drive wheel 13 is provided with a conventional pneumatic tire 15 and with conventional hydraulic brake means including the brake shoe housing 16 fixed upon the axle housing 12 in conventional manner.

The usual hose 17 leads from the brake shoe housing 16 to the conventional hydraulic brake operating means. All of the above parts may be of any usual and conventional construction and in themselves form no part of the present invention.

The anti-skid mechanism may be carried upon a bracket as indicated at 18, the forward end of which may be attached to any suitable point on the vehicle, such as the axle housing 12 as by the U-bolts 19. The rear end of the bracket 18 may be connected to the frame 10 as by the shock absorber 20, connected at its lower end to the bracket, as by a knuckle 21, and at its upper end to the frame, as by a knuckle 22, providing for relative vertical movement between the bracket 18 and frame 10.

A bearing block 23 is mounted upon the top of the bracket 18, intermediate the ends thereof, and attached thereto as by the bolts 24. A lever 25 is fulcrumed at a point near one end as by the short shaft 26 journalled in the bearing block 23.

The anti-skid wheel 27 is of the same diameter as the drive wheel 13 and is provided with a pneumatic tire 28, of the same size as the tire 15 upon the drive wheel, and a conventional tire chain 29 is mounted thereon.

This anti-skid wheel is journalled upon an axle 30 carried upon the rear end portion of the lever 25. The anti-skid wheel is provided with a brake mechanism similar to the brake mechanism upon the drive wheel.

The brake shoe housing 31 of this brake mechanism is provided with a central boss 32 which is rigidly attached to the lever 25 as by the bolts 33. A hose 34 leads from the brake shoe housing 31 of the anti-skid wheel to the conventional hydraulic brake operating means to which the hose 17 of the brake on the driving wheel 13 is connected, so that the brakes may be simultaneously applied to each driving wheel 13 and the corresponding anti-skid wheel 27.

An idler wheel 35, having a ribbed or corrugated peripheral surface 36, is journalled upon the forward end of the lever 25 as indicated at 37, in such position that the ribbed periphery of the idler wheel is in contact with the tread of the tire 28 upon the anti-skid wheel 27.

Figure 2:
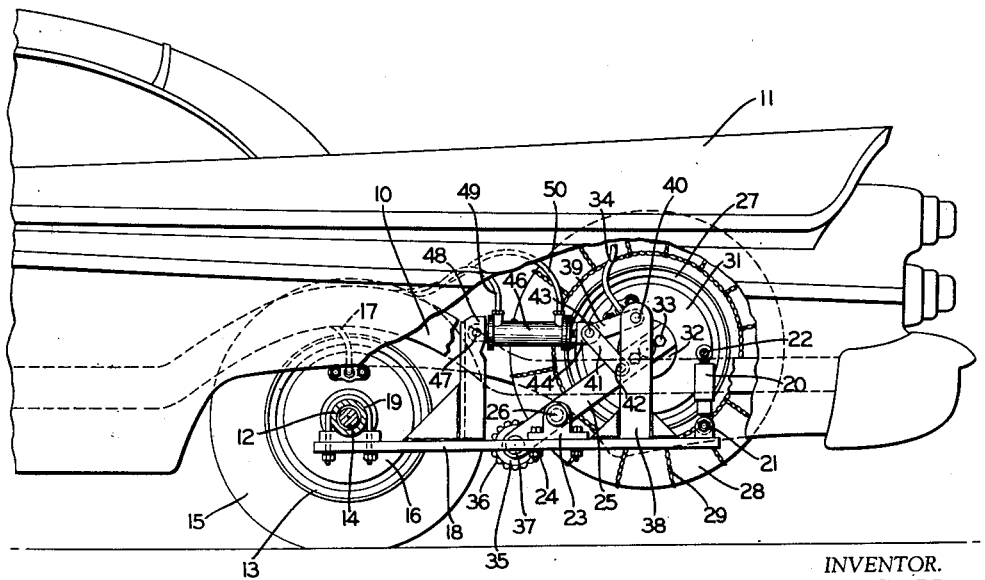
Fig. 2 is a view similar to Fig. 1, showing the anti-skid wheel in the raised position, housed within the rear fender and operatively disconnected from the drive wheel.

Normally, when the anti-skid wheel 27 is in the raised position, the periphery of the idler wheel 35 is out of contact with the tire 15 of the corresponding driving wheel 13, as shown in Fig. 2. When the anti-skid wheel is lowered into contact with the ground, the periphery of the idler wheel 36 is in frictional contact with the tread of the tire 15 of the drive wheel, as shown in Fig. 1.

As best shown in Fig. 6, in this position the ribbed periphery of the idler wheel is preferably adapted to bite into the tread of the tire 15 of the drive wheel so as to cause the corresponding anti-skid wheel to be rotated in the same direction and at the same speed as the drive wheel.

For the purpose of raising and lowering the anti-skid wheels a hydraulically operated toggle lever device is provided for each anti-skid wheel. For this purpose, a post 38 is mounted upon each bracket 18 near the rear end thereof. A toggle lever 39 is fulcrumed as at 40 upon the upper end of each post 38 and a toggle lever 41 is fulcrumed as at 42 upon each lever 25 intermediate the ends thereof.

The opposite ends of the toggle levers 39 and 41 are preferably connected together by a pin 43 which also is connected to the head 44 upon the outer end of a piston rod 45. This piston rod is connected to a conventional piston (not shown) within a hydraulic cylinder 46 which is pivotally connected at its forward end, as indicated at 47, to the upper end of a post 48 mounted upon the bracket 18 near the forward end thereof.

Each cylinder 46 is a double-acting cylinder having hose lines 49 and 50 connected to the forward and rear ends thereof respectively. The hose lines 49 and 50 from the hydraulic cylinders 46 for the anti-skid device on each side of the automobile lead to the couplings 51 and 52 upon a valve, indicated generally at 53, which is connected by hose lines 54 and 55 with opposite sides of a pump or the like.

The valve 53 should be installed at a point convenient for the driver of the car to operate, as by the valve handle 56, so as to connect the hose line 54 to the hose lines 49 and hose line 55 to the hose lines 50, or to alternately connect the hose line 54 with the hose lines 50 and the hose line 55 with the hose lines 49, in order to simultaneously raise or lower the anti-skid wheels on opposite sides of the car through operation of the levers 25 through the toggle levers 39 and 41 and hydraulic cylinders 46.

With this construction, the anti-skid wheels 27 with tire chains 29 upon the tires thereof, may be normally carried in raised or inoperative position substantially within the rear fenders 11 of the automobile, and out of contact with the ground and with the corresponding drive wheels.

When slippery or icy roads are encountered, the driver may operate the valve handle 56 to immediately lower the antiskid wheels into contact with the road surface, at which time the ribbed idler wheels 35 operatively connect the anti-skid wheels to the corresponding drive wheels, so that they will be driven in the same direction and at the same speed as the drive wheels, the tire chains upon the anti-skid wheels giving the same amount of traction as conventional tire chains mounted upon drive wheels of an automobile.

From the above it will be evident that a simple, efficient and easily operated means is provided for preventing skidding of an automobile or similar vehicle and giving increased traction so as to prevent slipping or spinning of the driving wheels on slippery road surfaces.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In combination with a drive wheel of a vehicle having a rubber tire thereon, an anti-skid device including a bracket supported upon the vehicle and extending rearwardly of the drive wheel, a lever fulcrumed intermediate its ends upon said bracket, an anti-skid wheel journalled upon the rear end of said lever directly behind the drive wheel and having a tire thereon of the same diameter as the tire on the drive wheel and having a tire chain located around the tread thereof, an idler wheel journalled upon the forward end of the lever, said idler wheel engaging the tread of the anti-skid wheel and being normally out of contact with the drive wheel, and means for moving the lever upon its fulcrum to move the anti-skid wheel into contact with the ground and to simultaneously move the idler wheel into contact with the tread of the drive wheel.

2. In combination with a drive wheel of a vehicle having a rubber tire thereon, brake means on said drive wheel, an anti-skid device including a bracket supported upon the vehicle and extending rearwardly of the drive wheel, a lever fulcrumed intermediate its ends upon said bracket, an anti-skid wheel journalled upon the rear end of said lever directly behind the drive wheel and having a tire thereon of the same diameter as the tire on the drive wheel and having a tire chain located around the tread thereof, brake means on said anti-skid wheel, an idler wheel journalled upon the forward end of the lever, said idler wheel engaging the tread of the anti-skid wheel and being normally out of contact with the drive wheel, and means for moving the lever upon its fulcrum to move the anti-skid wheel into contact with the ground and to simultaneously move the idler wheel into contact with the tread of the drive wheel, and means for simultaneously operating both of said brake means.

3. In combination with a drive wheel of a vehicle having a rubber tire thereon, an anti-skid device including a bracket supported upon the vehicle and extending rearwardly of the drive wheel, a lever fulcrumed intermediate its ends upon said bracket, an anti-skid wheel journalled upon the rear end of said lever directly behind the drive wheel and having a tire thereon of the same diameter as the tire on the drive wheel and having a tire chain located around the tread thereof, an idler wheel journalled upon the forward end of the lever, said idler wheel engaging the tread of the anti-skid wheel and being normally out of contact with the drive wheel, a pair of toggle levers, one of said toggle levers being pivotally connected to said bracket, the other toggle lever being pivotally connected to said lever, a hydraulic cylinder pivotally mounted upon said bracket, and a piston rod in said cylinder pivotally connected to said toggle levers for moving said lever upon its fulcrum to move the anti-skid wheel into contact with the ground and to simultaneously move the idler wheel into contact with the tread of the drive wheel.

4. In combination with a drive wheel of a vehicle having a rubber tire thereon, brake means on said drive wheel, an anti-skid device including a bracket supported upon the vehicle and extending rearwardly of the drive wheel, a lever fulcrumed intermediate its ends upon said bracket, an anti-skid wheel journalled upon the rear end of said lever directly behind the drive wheel and having a tire thereon of the same diameter as the tire on the drive wheel and having a tire chain located around the tread thereof, brake means on said anti-skid wheel, an idler wheel journalled upon the forward end of the lever, said idler wheel engaging the tread of the anti-skid wheel and being normally out of contact with the drive wheel, a pair of toggle levers, one of said toggle levers being pivotally connected to said bracket, the other toggle lever being pivotally connected to said lever, a hydraulic cylinder pivotally mounted upon said bracket, and a piston rod in said cylinder pivotally connected to said toggle levers for moving said lever upon its fulcrum to move the anti-skid wheel into contact with the ground and to simultaneously move the idler wheel into contact with the tread of the drive wheel, and means for simultaneously operating both of said brake means.

References Cited in the file of this patent
UNITED STATES PATENTS

| | | |
|---|---|---|
| 1,506,952 | Stackhouse | Sept. 2, 1924 |
| 2,062,931 | Roffa | Dec. 1, 1936 |
| 2,463,634 | Martinis | Mar. 8, 1949 |
| 2,767,809 | Sutter | Oct. 23, 1956 |